(12) United States Patent
Fukuoka

(10) Patent No.: US 11,836,396 B2
(45) Date of Patent: Dec. 5, 2023

(54) INFORMATION PROCESSING APPARATUS THAT CONVERTS AN ELEMENT THAT CANNOT BE CONVERTED INTO PRINT DATA BY EXTERNAL APPARATUS CONTROL METHOD THEREOF, AND STORAGE MEDIUM

(71) Applicant: CANON KABUSHIKI KAISHA, Tokyo (JP)

(72) Inventor: Sho Fukuoka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/873,373

(22) Filed: Jul. 26, 2022

(65) Prior Publication Data

US 2023/0032207 A1 Feb. 2, 2023

(30) Foreign Application Priority Data

Jul. 30, 2021 (JP) .................................. 2021-126045

(51) Int. Cl.
*G06F 3/12* (2006.01)

(52) U.S. Cl.
CPC .......... *G06F 3/1206* (2013.01); *G06F 3/1247* (2013.01)

(58) Field of Classification Search
USPC ................................................ 358/1.2, 1.15
See application file for complete search history.

(56) References Cited

U.S. PATENT DOCUMENTS

| 2005/0105148 A1* | 5/2005 | Misawa ................. G06V 30/40 358/537 |
| 2011/0145694 A1* | 6/2011 | Graves ................ G06F 16/9577 715/234 |
| 2013/0335763 A1* | 12/2013 | Mizutani ............ G06K 15/1859 358/1.13 |
| 2015/0379382 A1* | 12/2015 | Mizoguchi ............ G06F 3/1247 358/1.15 |
| 2016/0142582 A1* | 5/2016 | Kobayashi ......... H04N 1/00456 358/1.2 |
| 2017/0249108 A1* | 8/2017 | Nakata .................. G06F 3/1206 |
| 2017/0357884 A1* | 12/2017 | Friedman ......... G06K 19/06075 |
| 2018/0324323 A1* | 11/2018 | Kawara ................. G06F 3/1298 |

FOREIGN PATENT DOCUMENTS

| JP | 2013161196 A | * | 8/2013 |
| JP | 2013161196 A | | 8/2013 |

* cited by examiner

*Primary Examiner* — Henok Shiferaw
(74) *Attorney, Agent, or Firm* — Venable LLP

(57) ABSTRACT

The present information processing apparatus transmits content HTML format to an external apparatus to cause print data to be generated in the external apparatus. Furthermore, the information processing apparatus determines whether or not an element that cannot be converted into print data by the external apparatus is included in the elements included in the content and, as a result of the determination, converts the element that cannot be converted into print data by the external apparatus into a format that can be converted into print data. Moreover, the information processing apparatus transmits the converted element to the external apparatus to cause the external apparatus to generate print data of the content.

17 Claims, 12 Drawing Sheets

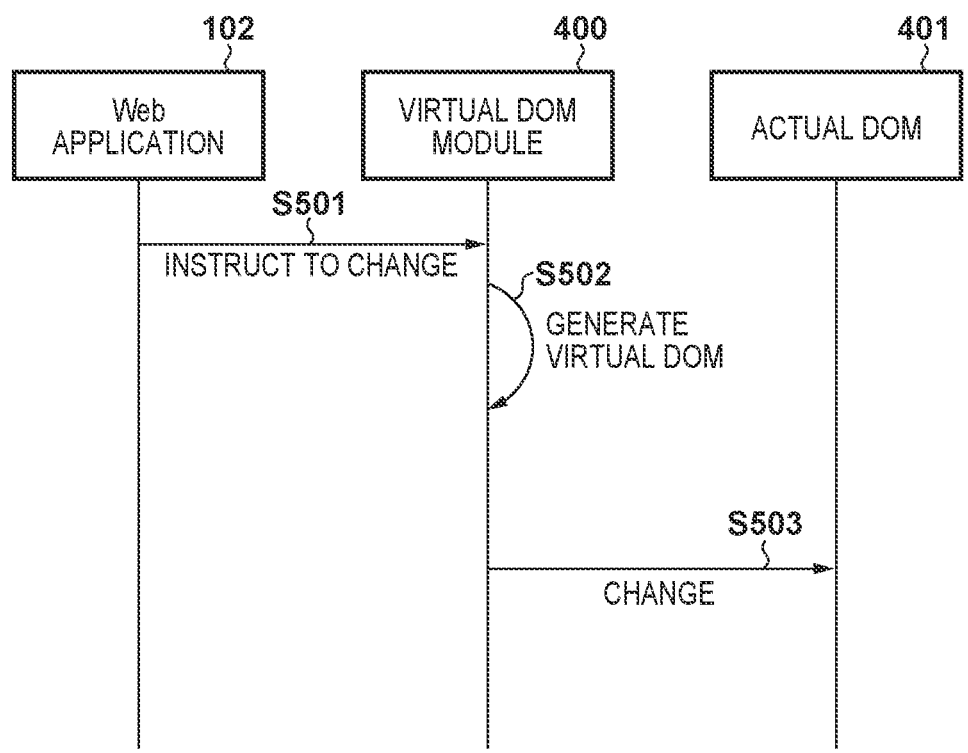

FIG. 7A

```
<html>
 <head></head>
 <body>
  <div>
   <span> SUMMER SALE </span>
  </div>
  <div>
   <img src="...">
  </div>
  <div>
   <img src="...">
  </div>
  <div>
   <span>50%OFF</span>
  </div>
  <QRCode path="https://...">
 </body>
</html>
```

FIG. 7B

```
<html>
 <head></head>
 <body>
  <div>
   <span> SUMMER SALE </span>
  </div>
  <div>
   <img src="...">
  </div>
  <div>
   <img src="...">
  </div>
  <div>
   <span>50%OFF</span>
  </div>
  <SVG><g>...</SVG>
 </body>
</html>
```

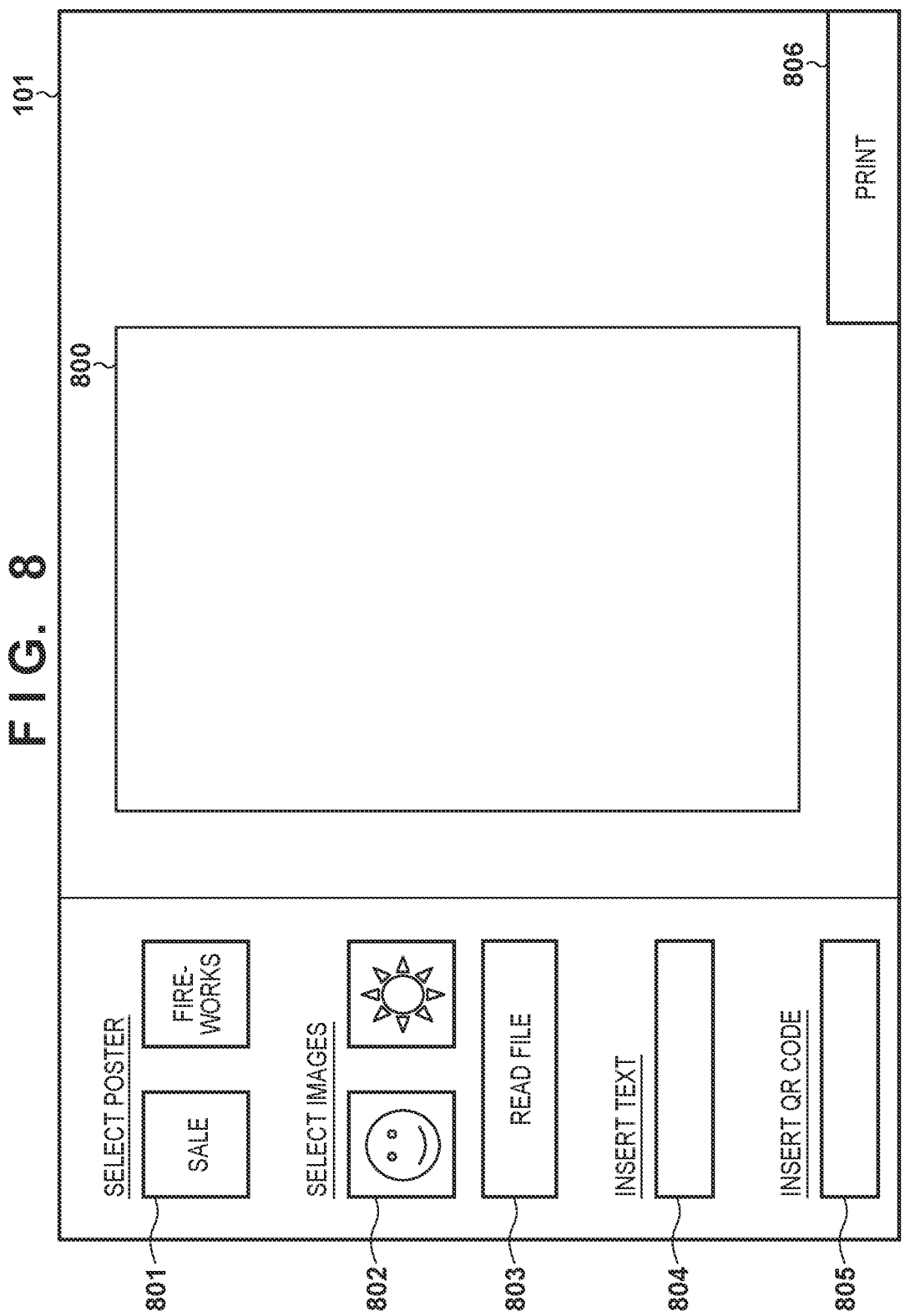

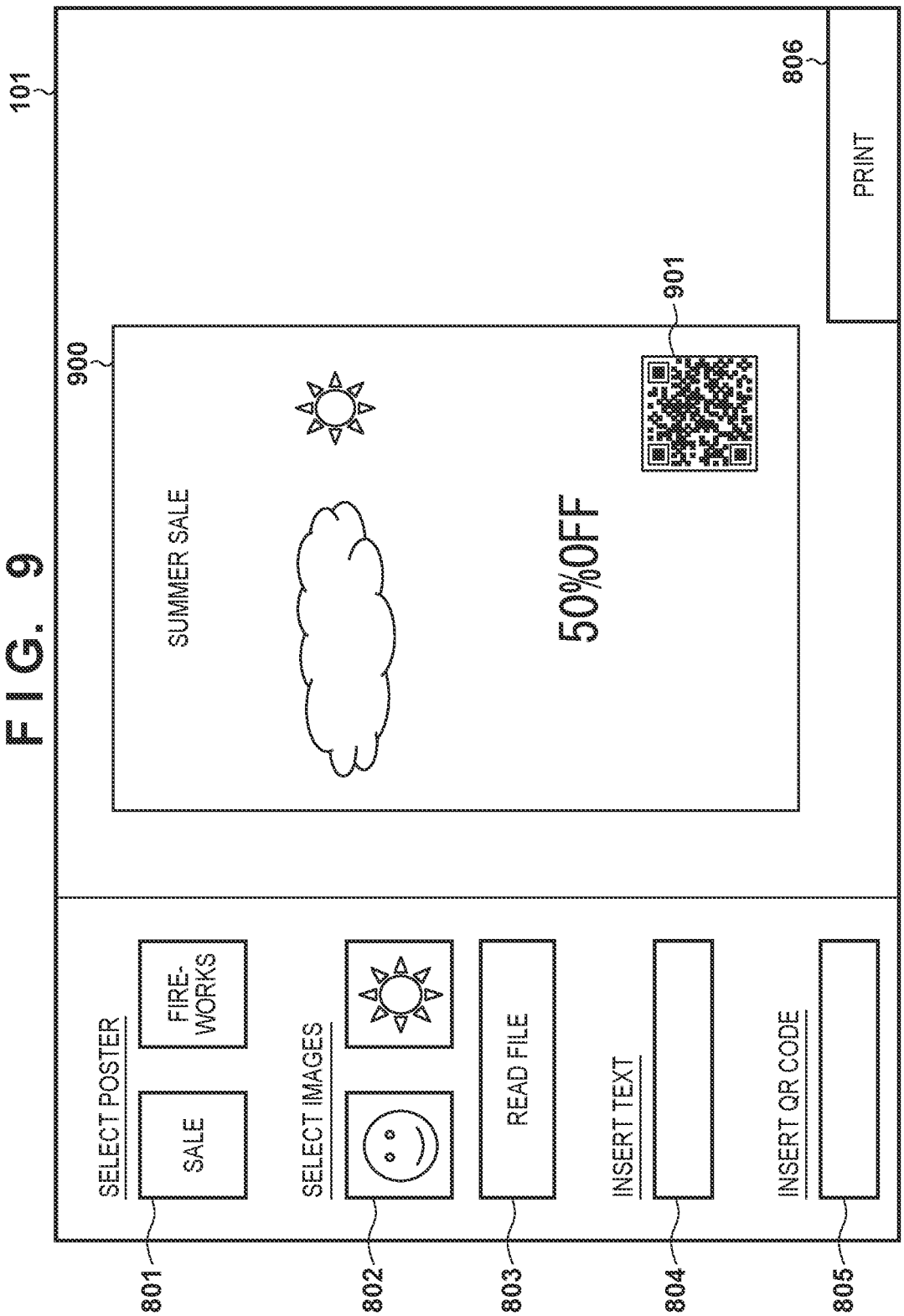

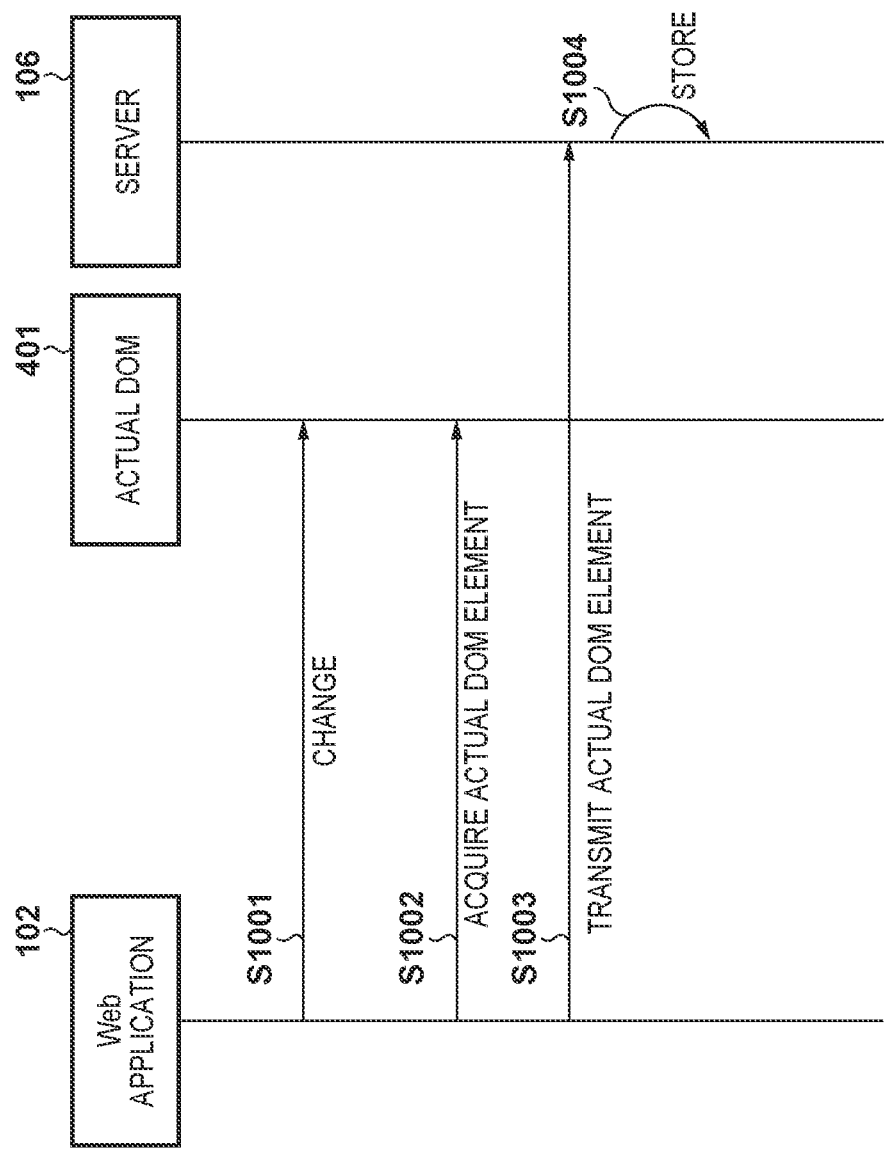

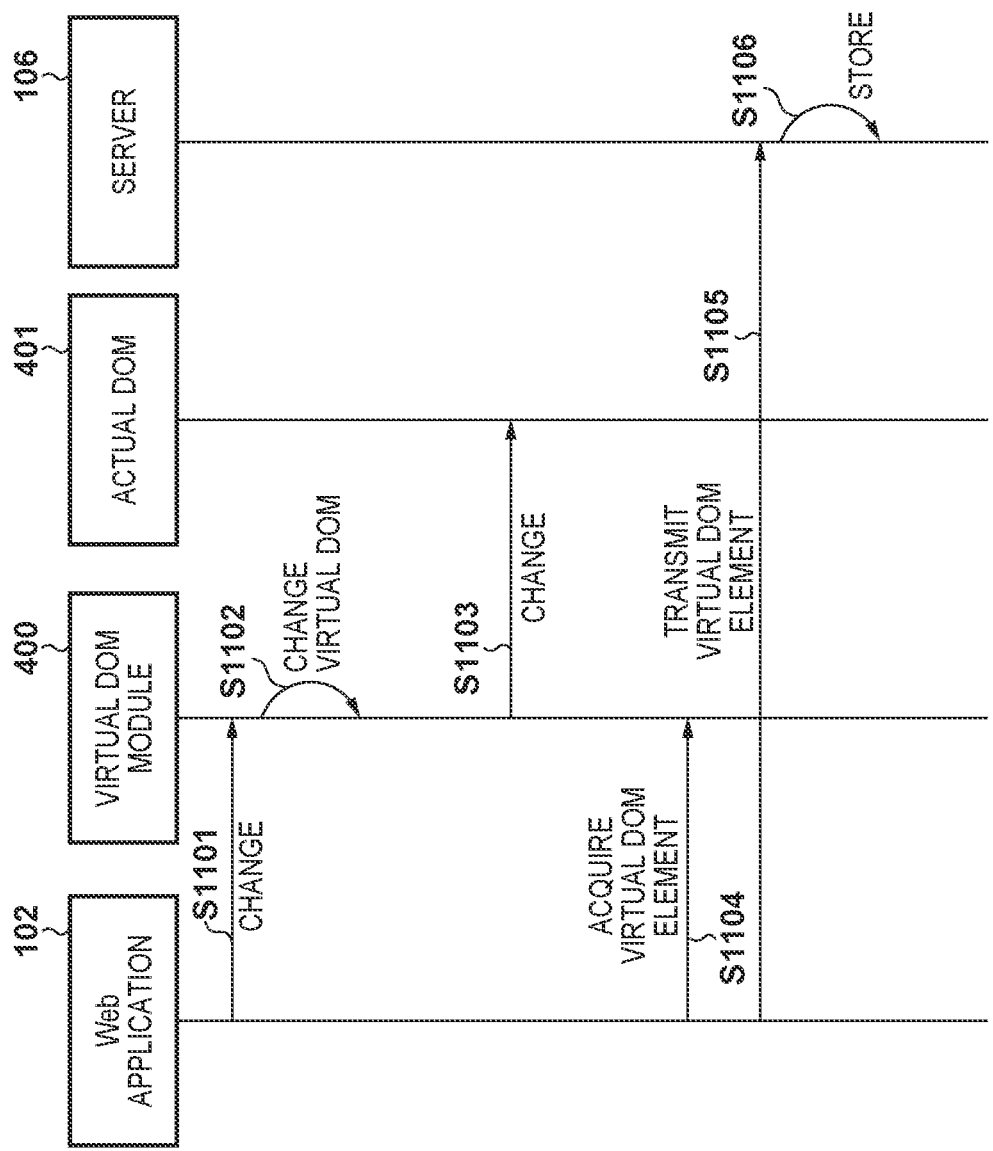

INFORMATION PROCESSING APPARATUS THAT CONVERTS AN ELEMENT THAT CANNOT BE CONVERTED INTO PRINT DATA BY EXTERNAL APPARATUS CONTROL METHOD THEREOF, AND STORAGE MEDIUM

BACKGROUND OF THE INVENTION

Field of the Invention

The present invention relates to an information processing apparatus, control method thereof and a storage medium.

Description of the Related Art

Programs called Web applications that run on a browser on a portable terminal or smartphone are known. The Web applications provide various functions as applications, and Web applications that generate print data, such as a poster, on a browser, save that data as a file, and request for printing from a printer, for example, are known. Japanese Patent Laid-Open No. 2013-161196 proposes a technique for generating HTML data in a Web application and generating print data in a server.

Here, the technology employed in a typical Web application will be described. A Web application user interface (hereinafter, UI) is described in a Hyper Text Markup Language (HTML) and is converted and rendered by a browser from HTML to an actually-displayed Web page. A technology called a Document Object Model (DOM) that handles HTML as tree-structured data as a method for manipulating an HTML document is known, and a Web application manipulates an HTML document via a DOM.

In addition, in recent years, a technology called a virtual DOM has become known. A virtual DOM is generated in a memory by a library that manipulates the virtual DOM, such as a virtual DOM module. In this case, the virtual DOM only exists in memory, and changes thereto are not detected by a browser and not reflected in the display of the web page. A virtual DOM module compares the virtual DOM with an actual DOM and, if there is a difference, changes the actual DOM to match the content of the virtual DOM. A virtual DOM refers to intermediate data that is deployed only in memory, separately from the actual DOM. In other cases, the programming concept of using such intermediate data to control an actual DOM is referred to as virtual DOM or using a virtual DOM. In this specification, a virtual DOM generally refers to intermediate data.

Using a virtual DOM brings Web application users and developers advantages such as increase in speed of operation of Web applications and enablement of complex representation. For example, normally, when there is a change in a DOM, a browser detects it and a screen is re-rendered. If a DOM is rewritten multiple times, unintentional re-rendering may occur, resulting in slow operation; however, if only a virtual DOM is changed, re-rendering of a browser will not occur. Using this to appropriately control the timing at which a virtual DOM module manipulates an actual DOM makes it possible to achieve operation acceleration.

There are also elements that are difficult to represent in normal HTML (e.g. QR Codes®). Since they do not exist in the HTML specification, it is necessary to separately create QR codes in images or the like. Therefore, a function for generating images from QR codes becomes necessary. Many virtual DOM modules can treat these elements as a virtual DOM and have a function for converting them from a virtual DOM to an actual DOM. This makes it possible for a Web application to easily generate these elements only by instructing a virtual DOM module to generate them.

However, in the above prior art, there is the following problem. There is a problem when data generated as HTML is to be generated into print data in an external apparatus that cannot interpret a virtual DOM. For example, when editing content in an HTML format and using that data for printing, since the generation of print data requires a large amount of memory, it may be executed not in a Web application but on a server. In such a case, a Web application transmits content data to a server, but the Web application recognizes the content only as a virtual DOM. Meanwhile, there are cases where a server lacks the ability to convert a virtual DOM into print data. In the above prior art, although a configuration in which HTML data is generated in a Web application and print data is generated on a server is employed, control that takes into account the ability to convert print data is not performed, and the above problem cannot be solved.

SUMMARY OF THE INVENTION

The present invention enables realization of a mechanism for accurately converting data generated as HTML containing virtual elements into print data even in another system where virtual elements cannot be interpreted.

One aspect of the present invention provides an information processing apparatus which transmits content in an HTML format to an external apparatus and causes print data to be generated in the external apparatus, the information processing apparatus comprising at least one memory device that stores a set of instructions; and at least one processor that executes the set of instructions to: determine whether or not an element that cannot be converted into print data in the external apparatus is included in elements included in the content; as a result of the determination, convert the element that cannot be converted into print data in the external apparatus into a format that can be converted into print data; and transmit the converted element to the external apparatus, to cause the external apparatus to generate print data of the content.

Another aspect of the present invention provides a method of controlling an information processing apparatus that transmits content in an HTML format to an external apparatus and causes print data to be generated in the external apparatus, the method comprising: determining whether or not an element that cannot be converted into print data in the external apparatus is included in elements included in the content; as a result of the determination, converting the element that cannot be converted into print data in the external apparatus into a format that can be converted into print data; and transmitting the element that has been converted to the external apparatus, to cause the external apparatus to generate print data of the content.

Still another aspect of the present invention provides a non-transitory storage medium storing a program that causes a computer to execute each process of a method for controlling an information processing apparatus that transmits content in an HTML format to an external apparatus and causes print data to be generated in the external apparatus, the method comprising: determining whether or not an element that cannot be converted into print data in the external apparatus is included in elements included in the content; as a result of the determination, converting the element that cannot be converted into print data in the external apparatus into a format that can be converted into print data; and transmitting the element that has been converted to the external apparatus, to cause the external apparatus to generate print data of the content.

Further features of the present invention will become apparent from the following description of exemplary embodiments (with reference to the attached drawings).

BRIEF DESCRIPTION OF THE DRAWINGS

FIG. 5 is a view illustrating a flow of DOM generation via a virtual DOM module according to the embodiment.

FIG. 6 is a view illustrating an internal configuration of poster data according to the embodiment.

FIGS. 7A and 7B are views illustrating an internal configuration of poster data for when virtual DOM elements according to the embodiment are included.

FIG. 8 is a view illustrating a Web application UI according to the embodiment.

FIG. 9 is a view illustrating a Web application UI during poster editing according to the embodiment.

FIG. 10 is a view illustrating a sequence for when editing poster data that does not include a virtual DOM according to the embodiment.

FIG. 11 is a view illustrating a sequence for when editing poster data that includes a virtual DOM according to the embodiment.

DESCRIPTION OF THE EMBODIMENTS

Figure 1:
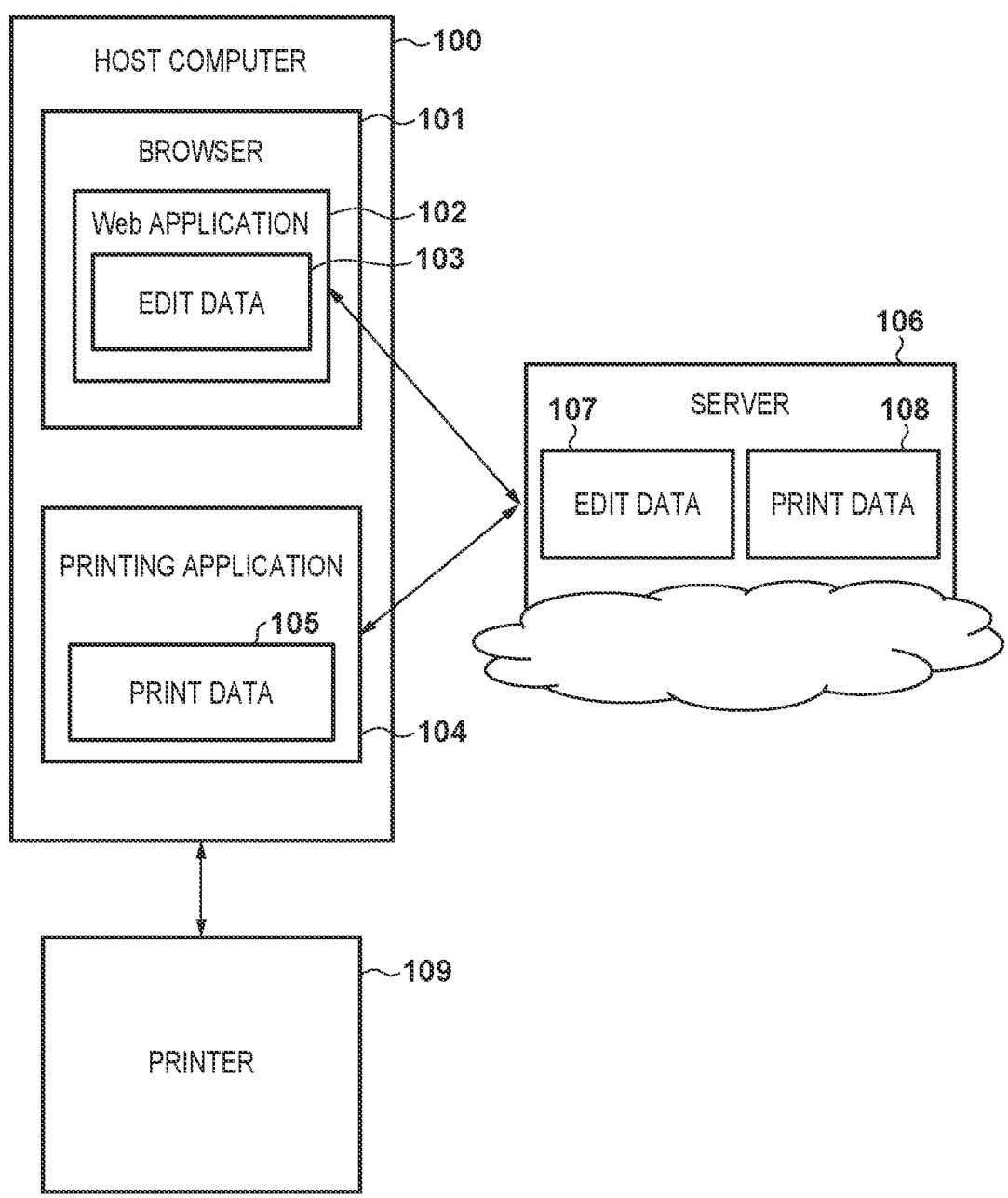
FIG. 1 is a view illustrating an example of a configuration of a printing system according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

<Configuration of Printing System>

An example of a configuration of a printing system according to the present invention will be described with reference to FIG. 1. The printing system illustrated in FIG. 1 is configured to include a host computer 100, a browser 101, a Web application 102, a printing application 104, a server 106, and a printer 109. It is assumed that the respective apparatuses are connected via a network so as to be able to communicate with each other. However, the host computer 100 and the printer 109 may be connected via a USB rather than a network.

The host computer 100, which is an information processing apparatus, includes the Web application 102 that runs on the browser 101 and the printing application 104. The Web application 102 and the printing application 104 can communicate with an external unit via a network interface included in the host computer 100 and can each communicate with the server 106 which is an external apparatus.

The Web application 102 is a Web application that runs on the browser 101 and enables editing of poster data to be used for printing. This data is held as edit data 103 and can be transmitted to and received from the server 106 as necessary. The server 106 holds the edit data 103 received from the host computer 100 as edit data 107.

The printing application 104 is an application that runs on an OS and enables printing of poster data, for example. As described above, print data is held as the edit data 103 and can be transmitted to the server 106 and processed on the server 106 as necessary. For example, if it is preferable to use the computer resources of the server 106, data may be transmitted to the server 106 and processed. Although one server is described here as an example, it is not intended to limit the present invention, and a plurality of servers may be used.

For example, the edit data 107 held by the server 106 converted into print data 108 in accordance with an instruction from the Web application 102 may be used as print data. In such a case, the printing application 104 holds the print data 108 received from the server 106 as print data 105 and uses it for printing. The printing application 104 can communicate with the printer 109 via a network interface, USB, a printer driver, and the like. The printing application 104 transmits the print data 105 to the printer 109 and executes printing by the printer 109.

<Server Configuration>

Figure 2:
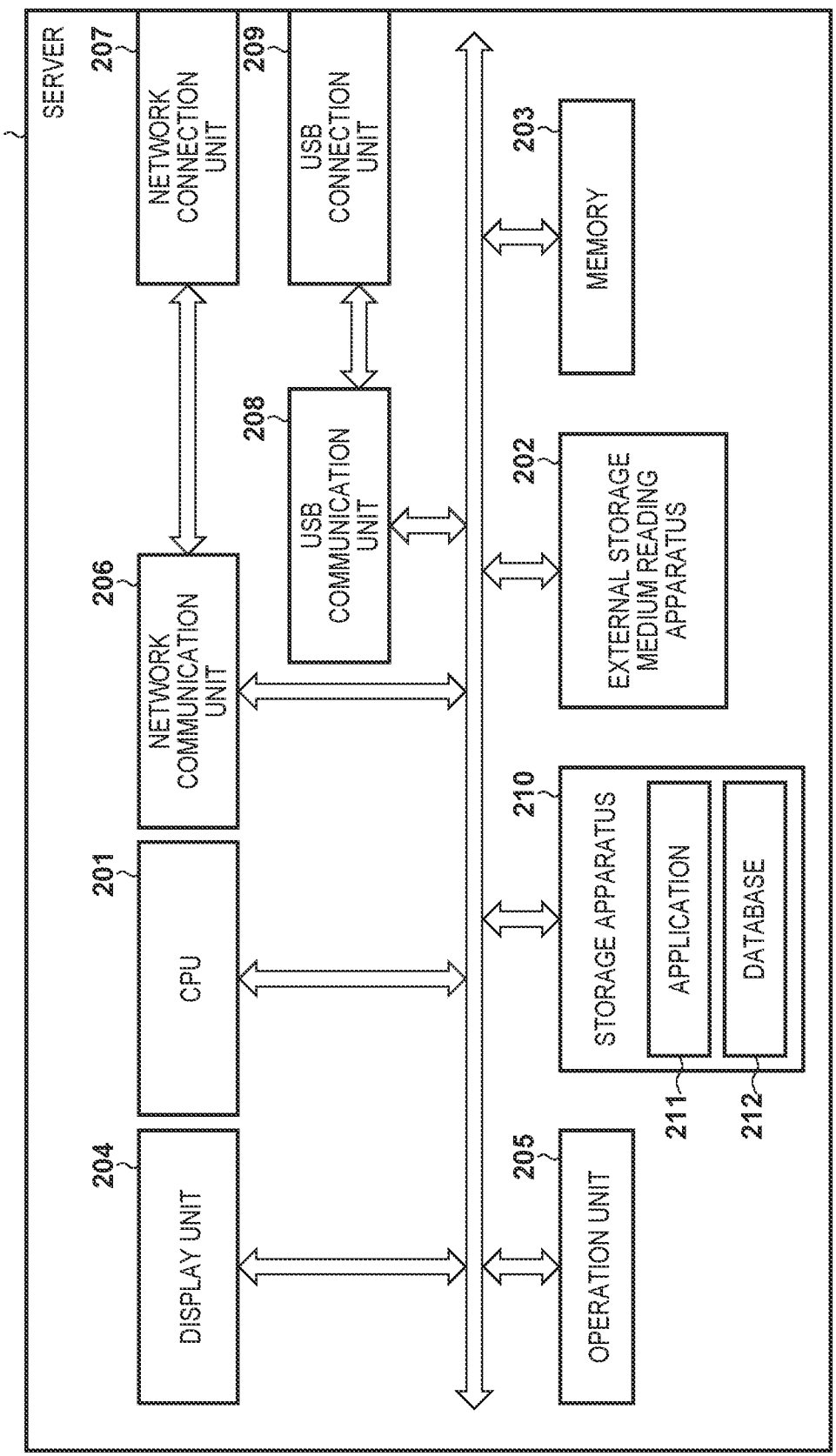
FIG. 2 is a view illustrating an example of a configuration of a server according to the embodiment.

Next, an example of a configuration of the server 106, which is an external apparatus, according to the present invention will be described with reference to FIG. 2. The server 106 includes a CPU 201, an external storage medium reading apparatus 202, a memory 203, a display unit 204, an operation unit 205, a network communication unit 206, a network connection unit 207, a USB communication unit 208, a USB connection unit 209, and a storage apparatus 210.

The CPU 201 is a central processing unit for controlling the following units. The storage apparatus 210 stores an application program 211, a database 212, an OS, and various files to be read by the CPU 201. The external storage medium reading apparatus 202 is an apparatus for reading information such as a file stored in an external storage medium such as an SD card. The memory 203 is configured by a RAM and the like, and the CPU 201 performs, for example, temporary storage and buffering of data as necessary.

The display unit 204 is configured by, for example, an LCD and displays various kinds of information. The operation unit 205 includes a keyboard, a mouse, and the like for the user to perform various input operations. The network communication unit 206 is connected to a network such as the Internet via the network connection unit 207 to perform various kinds of communication. The network communication unit 206 supports a wired LAN or wireless LAN; in the case the wired IAN is supported, the network connection unit 207 is a connector for connecting a wired LAN cable, and in the case the wireless LAN is supported, the network connection unit 207 is an antenna. In the present invention, when performing wireless communication by a wireless LAN, it is assumed that wireless communication conforming to the IEEE 802.11 standard series is performed. The network connection unit 207 may support both a wired LAN and a wireless LAN. The USB communication unit 208 is connected to various peripheral apparatuses via the USB connection unit 209 and performs various kinds of communication.

<Configuration of Host Computer>

Figure 3:
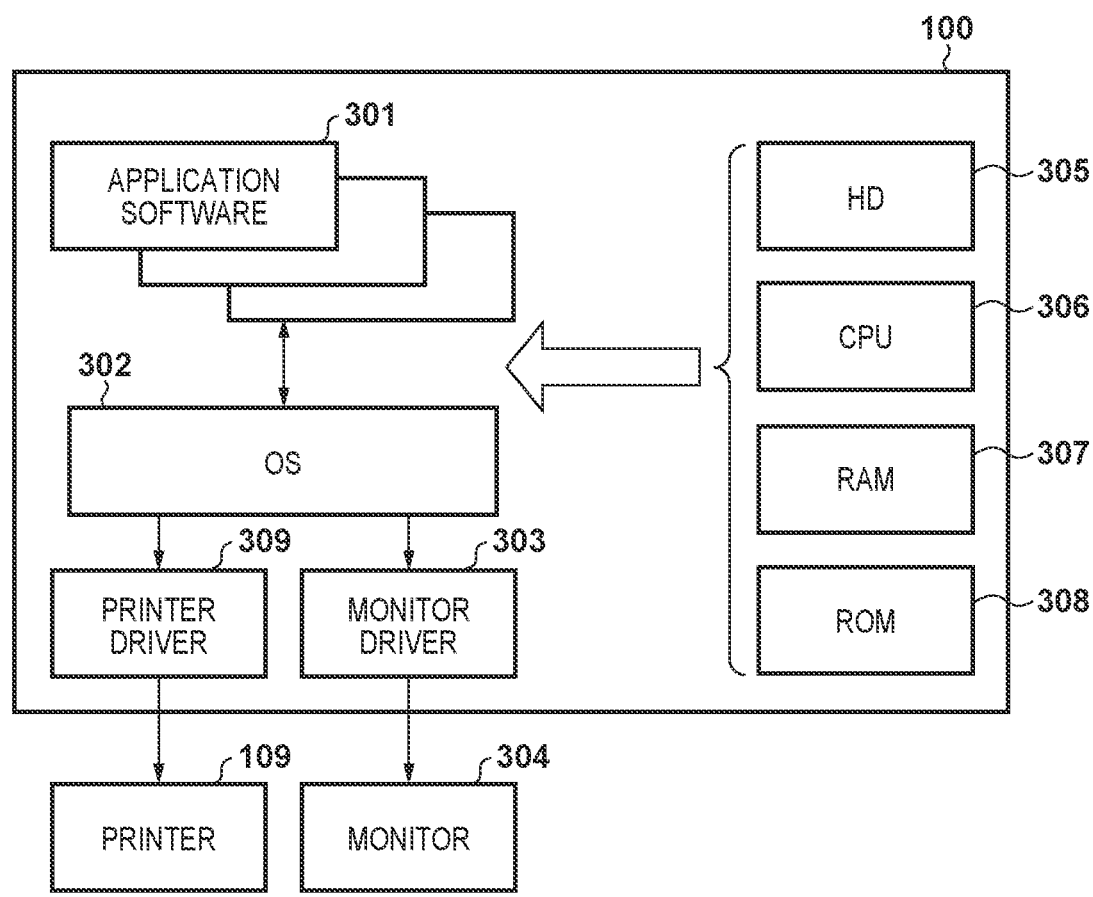
FIG. 3 is a view illustrating an example of a configuration of a host computer according to the embodiment.

Next, an example of a configuration of the host computer 100, which is an example of the information processing apparatus of the present invention, will be described with reference to FIG. 3. The printer 109 and a monitor 304 are connected to the host computer 100. As described above, the printer 109 may be connected via a network or via a USB interface. Therefore, the host computer 100 has communication connection components that correspond to the network communication unit 206, the network connection unit 207, the USB communication unit 208, and the USB connection unit 209 of the server 106 described above. For simplicity of explanation, these communication connection components are omitted in FIG. 3.

The host computer 100 includes application software 301, such as a word processor, a spreadsheet, and an Internet browser. A group of various rendering processing instructions (such as an image rendering instruction, a text rendering instruction, and a graphics rendering instruction) for instructing an output image issued by the application software 301 are inputted to a monitor driver 303 via an operating system (OS) 302. Meanwhile, when performing printing, a group of rendering instructions are inputted to a printer driver 309 via the OS 302. The printer driver 309 is software for processing the group of rendering instructions to create print data and cause the printer 109 to print it. The monitor driver 303 is software for processing the group of rendering instructions to cause the monitor 304 to display an image.

The host computer 100 includes hardware such as a CPU 306, a hard disk (HD) 305, a RAM 307, and a ROM 308 for storing and functioning the software described above. Here, a description will be given using as an example a form in which arbitrary application software having a printing function is installed in the host computer 100 and the monitor 304 and the printer 109 are connected.

In the host computer 100, the application software 301 creates output image data using text data classified into text such as characters, graphics data classified into graphics such as shapes, image data classified into photographic images, and the like. The created output image data is displayed on the monitor 304. Furthermore, when printing an image based on the created output image data, a print output request of the application software 301 is issued to the printer 109 via a network. A print output request includes a group of rendering instructions such as a text rendering instruction for a text data portion, a graphics rendering instruction for a graphics data portion, and an image rendering instruction for an image data portion. However, the application software 301 may be configured to make a print output request to the OS 302. In such a case, the application software 301 issues to the OS 302 a group of rendering instructions consisting of a text rendering instruction for a text data portion, a graphics rendering instruction for a graphics data portion, and an image rendering instruction for an image data portion.

<Relationship between Web Application and Virtual DOM and Actual DOM>

Figure 4:
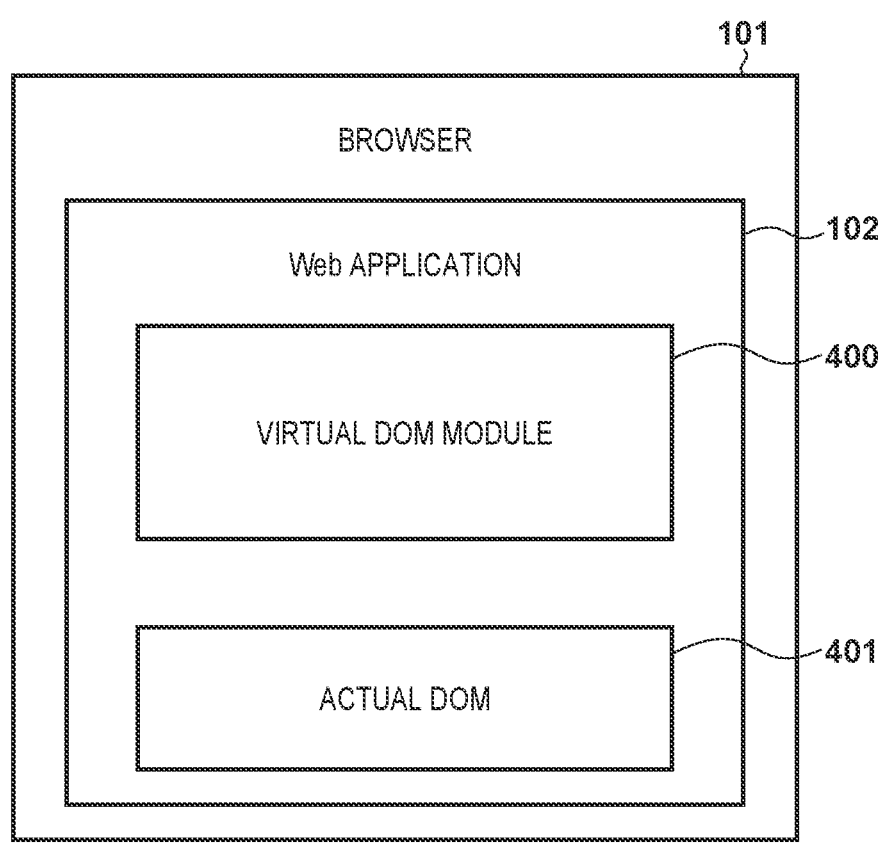
FIG. 4 is a view illustrating a concept of a Web application that generates a virtual DOM according to the embodiment.

FIG. 4 illustrates a configuration for when manipulating a virtual DOM and an actual DOM 401 in the Web application 102 that runs on the browser 101.

The Web application 102 internally holds a virtual DOM module 400. The actual DOM 401 exists within the Web application 102 and may be controlled by the Web application 102 or by the virtual DOM module 400.

A DOM is a document object model that handles HTML as tree-structured data. The Web application 102 may manipulate the HTML document via the DOM. A virtual DOM is an element that is not in the HTML standard specification and is a virtual element for incorporating, into HTML, an element such as a QR code that is difficult to represent in HTML. The virtual DOM module 400 can treat virtual elements such as QR codes as part of a virtual DOM and has a function for conversion from the virtual DOM to the actual DOM. For example, if a virtual DOM includes a QR code element, the virtual DOM module 400 can generate an actual image from the QR code. The Web application 102 can easily generate such an actual image only by giving a generation instruction to the virtual DOM module 400.

Furthermore, a virtual DOM is generated in a memory by the virtual DOM module 400 that manipulates the virtual DOM. In this case, since the virtual DOM is generated only in the memory, changes thereto are not detected by the browser 101, and do not trigger the web page to be redisplayed. Therefore, there is the possibility that print data is not included in the actual DOM 401 unless the virtual DOM module 400 and the actual DOM 401, unless the actual DOM 401 are compared, a and the actual DOM 401 is changed to correspond to the content of the virtual DOM when they differ. As described above, a virtual DOM refers to intermediate data that is deployed only on a memory separately from an actual DOM, and the virtual DOM may be omitted when conversion to print data is performed on a server or the like that cannot interpret virtual DOMs.

<Sequence for Changing DOM>

Next, a sequence for when changing the actual DOM 401 via the virtual DOM module 400 will be described with reference to FIG. 5. The processing to be described below is realized, for example, by the CPU 306 reading to the RAM 307 and executing a program stored in the ROM 308 or the HD 305.

In step S501, the Web application 102 makes a virtual DOM change instruction to the virtual DOM module 400. In step S502, the virtual DOM module 400 generates a virtual DOM in response to the instruction from the Web application 102. In step S503, the virtual DOM module 400 further changes the content of the actual DOM 401 in accordance with the generated virtual DOM.

Here, the actual DOM 401 includes elements such as images, text, and Scalable Vector Graphics (SVG) that exist in the HTML standard specification. In addition to the elements that exist in the HTML standard specification, a virtual DOM includes elements that do not exist in the HTML standard specification, such as a OR code. A QR code generated as a virtual DOM is converted by the virtual DOM module 400 into a standard HTML element such as SVG and then converted into the actual DOM 401.

<Poster Data>

FIG. 6 illustrates an internal structure of poster data (content) according to the embodiment. Specifically, the poster data illustrated in FIG. 6 indicates content that includes a description in an HTML, format Detailed HTML markup is abbreviated here.

FIG. 7A illustrates an internal structure for when a virtual DOM element is further added to the poster data of FIG. 6. An element consisting of "QRCode" indicates a virtual DOM element. Data in this state exists on the virtual DOM module 400. Meanwhile, FIG. 7B illustrates an internal structure after converting a virtual DOM element to an actual DOM element. In this example, a portion that had been "QRCode" has been converted to "SVG", <Example of Web Application Screen>

Next, an example of a configuration of a screen in the Web application 102 will be described with reference to FIG. 8. The screen includes a function for arranging and editing images, text, and a QR code on a poster, communicating with the server 106, and executing printing via the printing application 104. The screen to be described below is also displayed, for example, on the monitor 304 of the host computer 100. Alternatively, it may be displayed on the display unit of another apparatus connected by communication.

The Web application 102 is configured by a preview editing region 800, a poster selection region 801, an image selection region 802, a file read button 803, a text insertion portion 804, a QR code insertion portion 805, and a print button 806. In the poster selection region 801, it is possible to select a poster that the Web application 102 holds as a template. The selected poster is displayed in the preview editing region 800. In the image selection region 802, it is possible to select an image that the Web application 102 holds as a template. The selected image is displayed in the preview editing region 800. When selected, the file read button 803 instructs the OS 302 to select and read an image held by the OS 302.

The text insertion portion 804 receives text input. When text is inserted into the text insertion portion 804, the text is displayed in the preview editing region 800. The QR code insertion portion 805 receives character string input that is acquired as a result when a QR code is read. When text is inputted to the QR code insertion portion 805, a QR code for which the text is set as a reading result is generated and displayed in the preview editing region 800.

The data displayed in the preview editing region 800 is held in the Web application 102 as the edit data 103. Alternatively, the data is transmitted to the server 106 by the Web application 102 and is held as the edit data 107 by the server 106. When the print button 806 is selected, the Web application 102 transmits to the server 106 the edit data 103 displayed in the preview editing region 800 as necessary to cause the server 106 to execute conversion from the edit data 107 to the print data 108. In addition, the printing application 104 is started in a print standby state. The printing application 104 started in a print standby state acquires the print data 108 from the server 106 and holds it internally as the print data 105. The held print data 105 is transmitted to the printer 109, and printing is executed. Here, the edit data 103 and the edit data 107 are data in an HTML format illustrated in FIGS. 6, 7A, and 7B, and the print data 105 and the print data 108 are image data in a raster format.

FIG. 9 illustrates an example in which poster data 900 is displayed in the preview editing region 800. The poster data 900 is data created using various functions of the reference numbers 801 to 805. A reference number 901 indicates a QR code inserted via the QR code insertion portion 805. The QR code 901 is treated as a virtual DOM by the virtual DOM module 400. That is, it exists only in a memory and does not exist as an actual DOM. Therefore, when printing something like the poster data 900, since there are apparatuses that cannot interpret virtual DOMs among apparatuses that create print data, and in such apparatuses, the QR code 901 is not printed. In the following embodiments, a control method for avoiding such printing omission will be described.

First Embodiment

Figure 12:
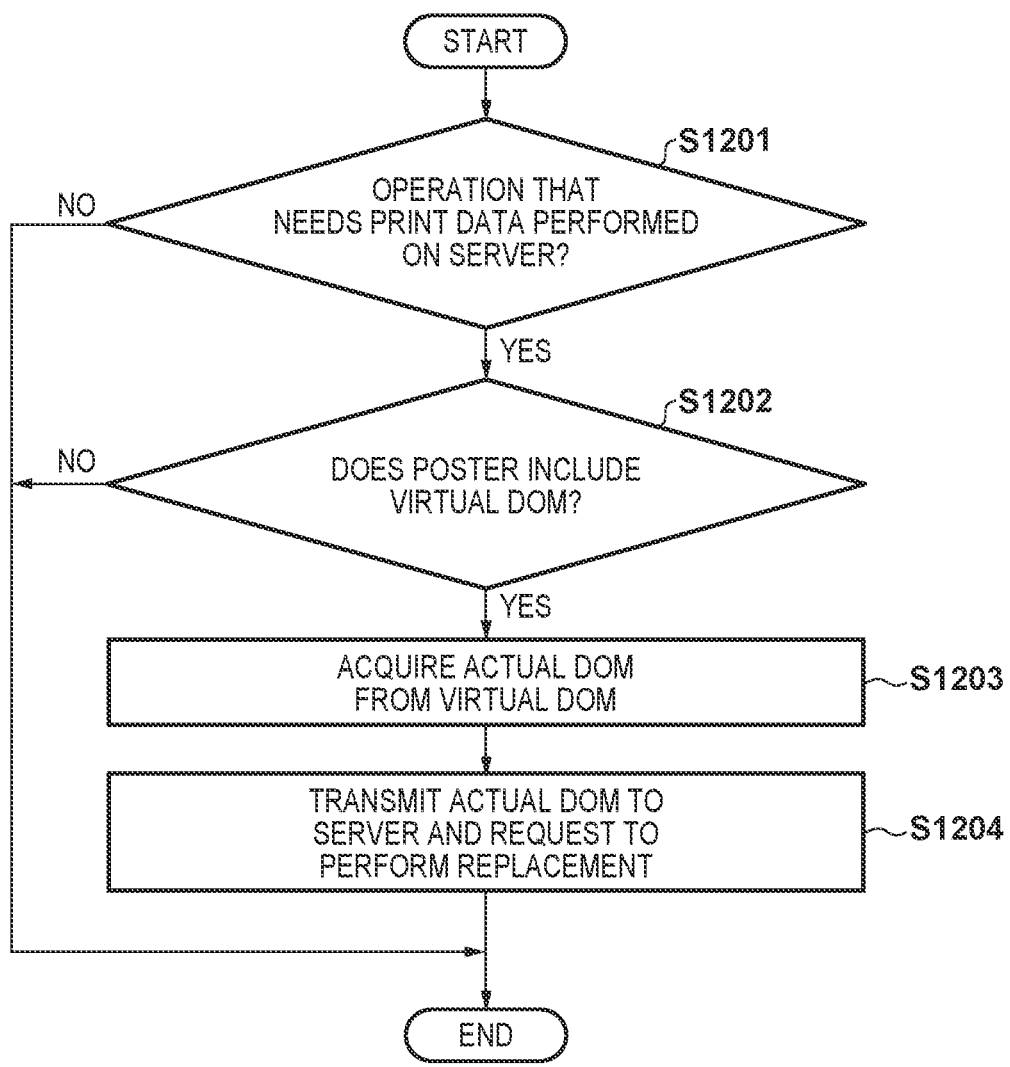
FIG. 12 is a flowchart illustrating a processing procedure for when changing processing to be performed on a virtual DOM according to the embodiment.

Hereinafter, a first embodiment of the present invention will be described with reference to FIGS. 10 to 12. First, a sequence for when a change is applied to an element that is not of a virtual DOM on the Web application 102 according to the present embodiment will be described with reference to FIG. 10. The poster data is in a state in which it is held in the server as the edit data 107.

In step S1001, the Web application 102 directly changes an element of the actual DOM 401. Next, in step S1002, the Web application 102 acquires the element of the actual DOM 401 that has been changed. In step S1003, the Web application 102 transmits the element acquired in step S1002 to the server 106. In step S1004, the server 106 stores the transmitted element.

Next, a sequence for when a change is added to an element that is a virtual DOM on the Web application 102 according to the present embodiment will be described with reference to FIG. 11.

In step S1101, the Web application 102 makes a virtual DOM change instruction to the virtual DOM module 400. Next, in step S1102, the virtual DOM module 400 changes the virtual DOM. In step S1103, regarding the Web application 102, the virtual DOM module 400 changes the actual DOM 401 in response to the content of the change in the virtual DOM. In step S1104, the Web application 102 acquires a changed virtual DOM element from the virtual DOM module 400. Next, in step S1105, the Web application 102 transmits the element acquired in step S1104 to the server 106 and causes the server 106 to upload the corresponding content. In step S1106, the server 106 stores the transmitted element in association with the corresponding content.

<Processing Procedure>

Next, a processing procedure for when the Web application 102 according to the present embodiment determines whether or not a data replacement instruction is necessary for the server 106 and executes it will be described with reference to FIG. 12. The processing to be described below is realized, for example, by the CPU 306 reading to the RAM 307 and executing a program stored in the ROM 308 or the RD 305.

In step S1201, the CPU 306 determines whether or not an operation that needs print data has been performed on the server 106. In the present embodiment, it is determined that print data is necessary on the server 106 when the print button 806 is selected, but it is not intended to limit the present invention and it may be of another method. If it is determined that print data is necessary on the server 106, the processing proceeds to step S1202; otherwise, the processing ends. In step S1202, the CPU 306 determines whether or not the poster data 900 includes a virtual DOM element. If it is determined that a virtual DOM element is included, the processing proceeds to step S1203, otherwise, the processing ends.

In step S1203, the CPU 306 acquires an actual DOM element based on the virtual DOM element. For example, an ID that associates a virtual DOM element with an actual DOM element is used to identify the corresponding actual DOM element, and the actual DOM element is obtained. Next, in step S1204, the CPU 306 transmits the actual DOM element acquired in step S1203 to the server 106 and instructs it to replace the corresponding element of the edit data 107.

As described above, the information processing apparatus according to the present embodiment transmits content HTMl format to an external apparatus to cause print data to be generated in the external apparatus. Furthermore, the information processing apparatus determines whether or not an element that cannot be converted into print data by the external apparatus is included in the elements included in the content and, as a result of the determination, converts the element that cannot be converted into print data by the external apparatus into a format that can be converted into print data. Moreover, the information processing apparatus transmits the converted element to the external apparatus to cause print data of the content to be generated. According to the above embodiment, in an application that handles virtual DOMs, data generated in HTML that includes a virtual DOM can be converted into print data by an external apparatus that cannot interpret virtual DOMs. That is, the information processing apparatus can accurately convert data generated in HTML that contains virtual elements into print data even in another system where virtual elements cannot be interpreted.

Second Embodiment

Hereinafter, a second embodiment of the present invention will be described. For example, in QR codes that are handled as virtual DOM elements, there are quality criteria, such as the minimum resolution for being read by a camera and composite parameters for restoration at the time of reading. In the present embodiment, it is assumed that the Web application 102 is displayed on the monitor 304. The size of the monitor 304 may be different from the size to be actually printed by the user. When utilizing a virtual DOM element, the virtual DOM module 400 generates an actual DOM element, and the virtual DOM module 400 generates a QR code with settings optimized for the monitor 304. Therefore, a virtual DOM element and an actual DOM element generated by the virtual DOM module 400 may not necessarily have optimal settings for printing and may not be readable as a QR code. Therefore, in the present embodiment, processing in which the quality at the time of printing of a DOM element after a change from a virtual DOM is taken into consideration will be described.

<Sequence for Handling Virtual DOM>

Figure 13:
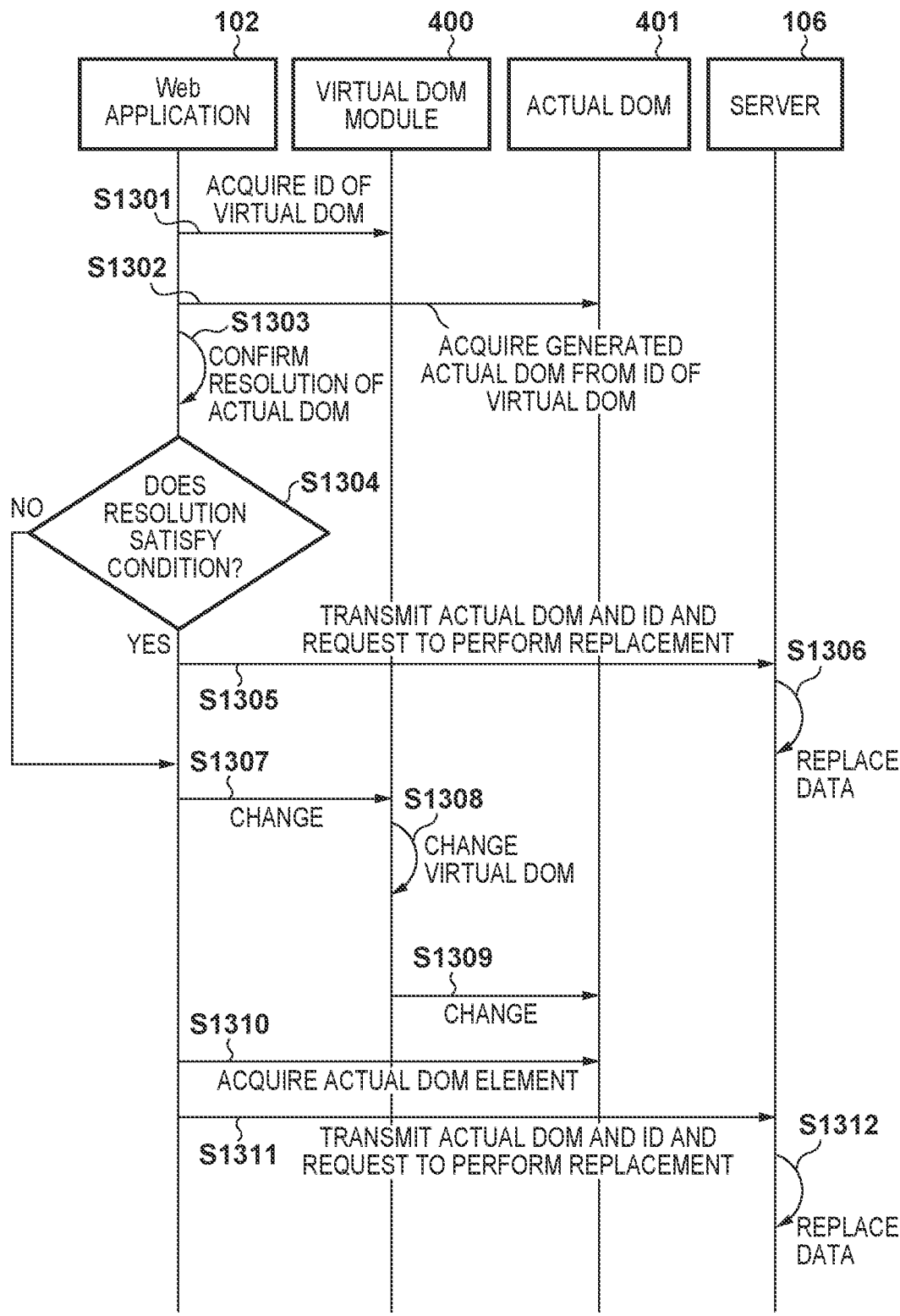
FIG. 13 is a view illustrating a sequence in which a condition for generating print data of a virtual DOM according to the embodiment is added and changed.

A sequence for handling the virtual DOM according to the present embodiment will be described with reference to FIG. 13. The sequence illustrated in FIG. 13 reflects the change of the processing of steps S1204 and S1205 of the Web application 102 illustrated in FIG. 12 to the processing according to this embodiment.

In step S1301, the Web application 102 acquires an ID of a target virtual DOM element from the virtual DOM module 400. Next, in step S1302, the Web application 102 acquires an actual DOM element associated with the ID. In step S1303, the Web application 102 confirms the resolution of the actual DOM element acquired in step S1302.

Next, in step S1304, the Web application 102 determines whether or not the confirmed resolution can maintain a necessary resolution when it is converted to print data. For example, a print size is specified, that size and the current size are compared, and it is determined from the enlargement/reduction ratio at that time. For example, a configuration may be taken such that when an enlargement ratio or a reduction ratio is equal to or higher than a predetermined value it is determined that a necessary resolution cannot be maintained after conversion. Although the above predetermined value is set to a default value, a configuration may be taken so as to allow it to be changed in accordance with user input. Furthermore, when a virtual DOM is a QR code, taking into account the quality at the time of printing, whether or not the readability of the QR code can be maintained at a resolution, that is, a print resolution, becomes a criterion for determination.

If it is determined in step S1304 that a necessary resolution can be maintained, the processing proceeds to step S1305; otherwise, the processing proceeds to step S1307. In step S1305, the Web application 102 transmits the actual DOM element acquired in step S1302 to the server 106 and instructs it to perform replacement with the corresponding element of the edit data 107. In step S1306, the server 106 performs data replacement.

Meanwhile, if it is determined in step S1304 that a necessary resolution cannot be maintained, in step S1307, the Web application 102 causes the virtual DOM module 400 to change the virtual DOM again. At this time, a change is instructed such that a resolution that anticipates the print size is achieved. The virtual DOM module 400 changes the virtual DOM in step S1308 and changes the actual DOM in step S1300.

Next, in step S1310, the Web application 102 acquires an actual DOM element from the actual DOM 401. Next, in step S1311, the Web application 102 transmits the acquired actual DOM element to the server 106 and instructs replacement. In step S1312, the server 106 performs data replacement and terminates the present sequence.

As described above, the information processing apparatus according to the present embodiment determines whether or not the quality of a converted element satisfies a predetermined criterion when converting an element and, when it is determined that the quality does not satisfy the predetermined criterion, converts the element so as to satisfy the predetermined criterion. By virtue of the present embodiment, it is possible to perform control that takes into account the quality at the time of printing when print data is generated in another system that cannot interpret virtual DOMs from data generated in HTML that includes a virtual DOM in an application that handles virtual DOMs.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD) or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No, 2021-126045, filed Jul. 30, 2021, which is hereby incorporated by reference herein in its entirety.

What is claimed is:

1. An information processing apparatus which transmits content in an HTML format to an external apparatus and causes print data to be generated in the external apparatus, the information processing apparatus comprising:
at least one memory device that stores a set of instructions; and
at least one processor that executes the set of instructions to:
determine whether or not an element that cannot be converted into print data in the external apparatus is included in the content;
as a result of the determination, convert the element that cannot be converted into print data in the external apparatus into a format that can be converted into print data; and
transmit the converted element to the external apparatus, to cause the external apparatus to generate print data of the content,
wherein the at least one processor further executes instructions in the memory device to:
in a case where converting the element, determine whether or not a quality of a converted element satisfies a predetermined criterion, and
in a case where it is determined that the quality of the converted element does not satisfy the predetermined criterion, convert the element so as to satisfy the predetermined criterion.

2. The information processing apparatus according to claim 1, wherein
the element is an element that is not in an HTML standard specification, and
the conversion unit converts the element to an element that is in the HTML standard specification.

3. The information processing apparatus according to claim 2, wherein
the element is a virtual element that is not displayed in a case where the content in the HTML format is displayed on a Web page.

4. The information processing apparatus according to claim 2, wherein
the element is a QR code, and
wherein the at least one processor executes instructions in the memory device to:
convert the QR code into a Scalable Vector Graphics (SVG).

5. The information processing apparatus according to claim 1,
wherein the at least one processor executes instructions in the memory device to:
edit the content in the HTML format, and
upload the edited content to the external apparatus.

6. The information processing apparatus according to claim 5,
wherein the at least one processor executes instructions in the memory device to:
add a QR code.

7. The information processing apparatus according to claim 1, wherein
the predetermined criterion is a print resolution, and
wherein the at least one processor executes instructions in the memory device to:
in a case where an enlargement ratio or a reduction ratio is greater than or equal to a predetermined value in a case where the content is converted to print data, determine that the predetermined criterion is not satisfied.

8. The information processing apparatus according to claim 1, wherein
in a case the element is a QR code, the quality relates to a readability of the QR code.

9. A method of controlling an information processing apparatus that transmits content in an HTML format to an external apparatus and causes print data to be generated in the external apparatus, the method comprising:
determining whether or not an element that cannot be converted into print data in the external apparatus is included in the content;
as a result of the determination, converting the element that cannot be converted into print data in the external apparatus into a format that can be converted into print data; and
transmitting the element that has been converted to the external apparatus, to cause the external apparatus to generate print data of the content,
wherein the method further comprises
in a case where converting the element, determining whether or not a quality of a converted element satisfies a predetermined criterion, and
in a case where it is determined that the quality of the converted element does not satisfy the predetermined criterion, converting the element so as to satisfy the predetermined criterion.

10. The control method according to claim 9, wherein
the element is an element that is not in an HTML standard specification, and
the conversion unit converts the element to an element that is in the HTML standard specification.

11. The control method according to claim 10, wherein
the element is a virtual element that is not displayed in a case where the content in the HTML format is displayed on a Web page.

12. The control method according to claim 10, wherein
the element is a QR code, and
the method further comprises:
converting the QR code into a Scalable Vector Graphics (SVG).

13. The control method according to claim 9, further comprising
editing the content in the HTML format, and
uploading the edited content to the external apparatus.

14. The control method according to claim 13, further comprising adding a QR code.

15. The control method according to claim 9, wherein
the predetermined criterion is a print resolution, and
the method further comprises:
in a case where an enlargement ratio or a reduction ratio is greater than or equal to a predetermined value when the content is converted to print data, determining that the predetermined criterion is not satisfied.

16. The control method according to claim 9, wherein
in a case the element is a QR code, the quality relates to a readability of the QR code.

17. A non-transitory storage medium storing a program that causes a computer to execute each process of a method for controlling an information processing apparatus that transmits content in an HTML format to an external apparatus and causes print data to be generated in the external apparatus, the method comprising:
- determining whether or not an element that cannot be converted into print data in the external apparatus is included in the content;
- as a result of the determination, converting the element that cannot be converted into print data in the external apparatus into a format that can be converted into print data; and
- transmitting the element that has been converted to the external apparatus, to cause the external apparatus to generate print data of the content,
- wherein the method further comprises
- in a case where converting the element, determining whether or not a quality of a converted element satisfies a predetermined criterion, and
- in a case where it is determined that the quality of the converted element does not satisfy the predetermined criterion, converting the element so as to satisfy the predetermined criterion.

* * * * *